United States Patent [19]

Bahnman et al.

[11] Patent Number: 4,622,806
[45] Date of Patent: Nov. 18, 1986

[54] DITCH SWATHER

[75] Inventors: Reuben Bahnman; Frank J. Dietz, both of Loreburn, Canada

[73] Assignee: Autotran Swather Limited, Loreburn, Canada

[21] Appl. No.: 697,862

[22] Filed: Feb. 4, 1985

[30] Foreign Application Priority Data

Feb. 7, 1984 [CA] Canada .................. 446942

[51] Int. Cl.⁴ ............................................ A01D 34/04
[52] U.S. Cl. ........................................ 56/16.2; 56/6; 56/15.5
[58] Field of Search ............... 56/15.5, 16.2, 6, 7, 56/233, 181, 10.7, 10.8, 237

[56] References Cited

U.S. PATENT DOCUMENTS

| | | | |
|---|---|---|---|
| 2,507,719 | 5/1950 | Kane et al. | 56/181 |
| 3,053,033 | 9/1962 | Maguire | 56/13.6 |
| 3,343,347 | 9/1967 | Burrough et al. | 56/181 |
| 3,400,521 | 9/1968 | Caldwell | 56/13.6 |
| 3,501,901 | 3/1970 | van der Lely | 56/13.6 |
| 3,650,096 | 3/1972 | Caldwell | 56/7 |
| 4,148,174 | 4/1979 | Mathews | 56/7 |
| 4,241,565 | 12/1980 | Parsons, Jr. | 56/233 |
| 4,502,269 | 3/1985 | Cartner | 86/10.7 |

Primary Examiner—Paul J. Hirsch
Attorney, Agent, or Firm—Stanley G. Ade

[57] ABSTRACT

A ditch swather comprises a transverse beam attached to single point hitch for drawing the beam forwardly in a direction transverse to its length with the beam support at either end by a pair of ground wheels. A swather section is pivotally mounted at one end of the frame and movable between a position inclined downwardly at 45° to a position vertically upwardly by operation of a hydraulic cylinder. A gauge wheel at the end of the swather section remote from the frame controls the position of the swather section relative to the ground. The ground wheels at the end of the beam adjacent the swather section are mounted on a walking beam. The reel sickle knife and draper of the swather are hydraulically driven.

16 Claims, 5 Drawing Figures

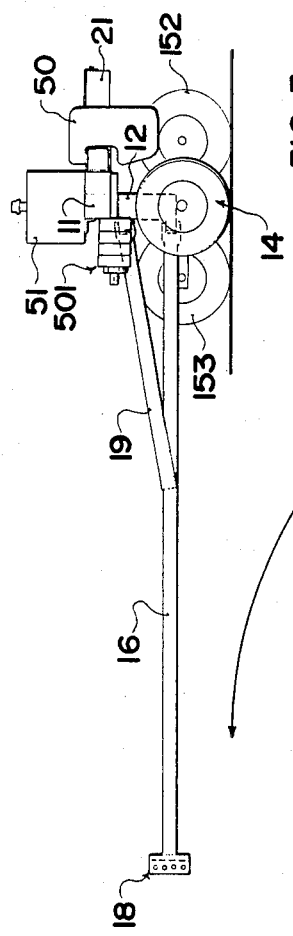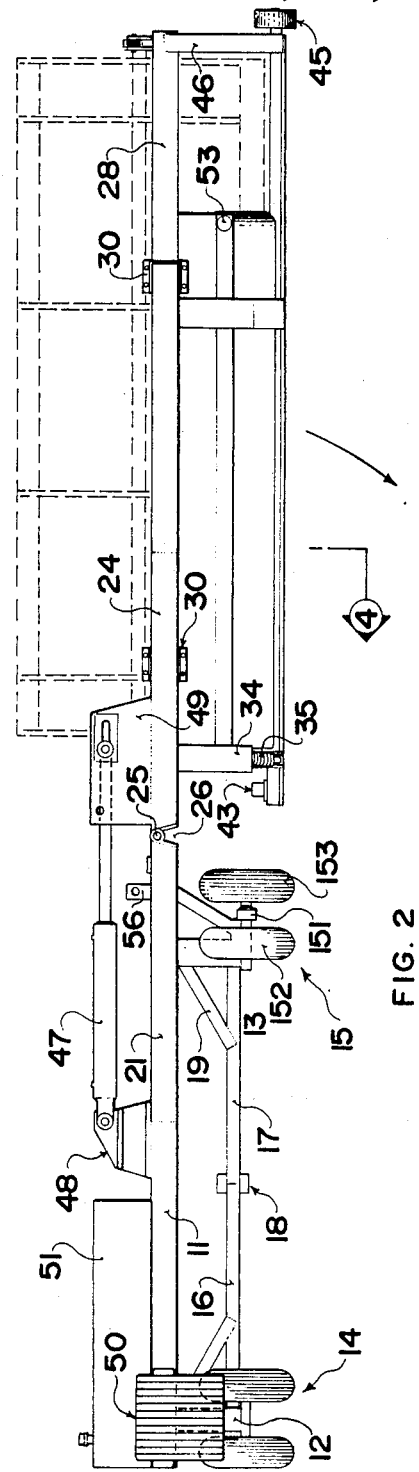

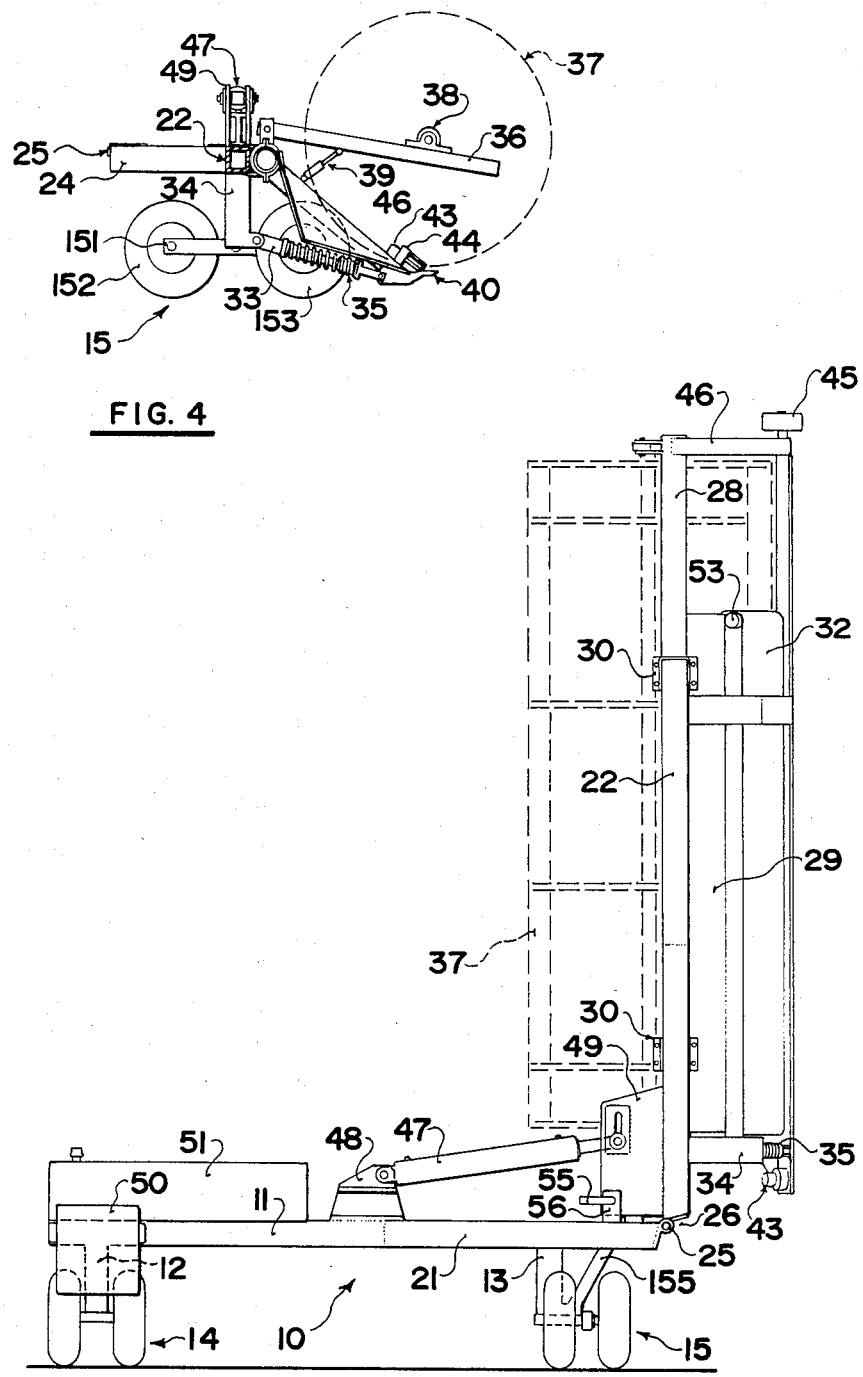

DITCH SWATHER

BACKGROUND OF THE INVENTION

This invention relates to a ditch swather for cutting grass or other crop in ditches and particularly for cutting grass in roadside ditches.

Various arrangements have been manufactured and proposed for cutting grass in roadside ditches or in some cases in irrigation ditches. Generally these comprise a rotary type mower arrangement which merely acts to cut down the grass. In addition, usually the device requires a three-point hitch arrangement so that the device can be tractor mounted.

Devices of this type have many disadvantages. Firstly, they can be costly in terms of maintenance and repairs. Secondly, they do not form a proper swath of the cut material and generally there is little or no intention to collect the material cut thus wasting effective cropping possibilities. Thirdly, the three-point hitch or other tractor mounting arrangement required means that it is often difficult to transfer the device from one tractor to another when required.

Fourthly, the machine operator must in many instances drive the tractor on a steep incline to cut the ditch properly, this is a very unsafe position. The materials cut and picked up such as rocks and debris, by rotary mowers are thrown at high velocity at the tractor operator and passing cars. This has resulted in injury and death to both.

Fifthly, the machine can at least double the speed of conventional rotary mowers.

Sixthly, the machine lowers costs of labour and time drastically.

SUMMARY OF THE INVENTION

It is one object of the present invention to provide a ditch swather which overcomes one or more of the above disadvantages.

According to the invention, therefore, there is provided a ditch swather comprising a frame having spaced parallel ground wheels for supporting the frame and hitch means by which the frame can be pulled in a direction transverse to its length to follow behind the hitch means, a swather device including a reciprocating toothed drive blade for cutting a crop, a reel and a draper for guiding the cut crop into a swath for deposit behind the swather device, means mounting the swather device on one end of the frame such that the swather device extends outwardly from said one end for forward motion with said frame, said mounting means allowing pivotal movement of the swather device relative to the end of the frame about a horizontal axis transverse to the frame whereby the swather device can incline downwardly for operating upon a ground surface inclined to the ground surface on which the frame is supported and including means for lifting said swather device from said downwardly inclined position and a gauge wheel on the end of the swather device remote from the frame for controlling the height from the inclined ground surface of the blade.

It is one advantage of the invention, therefore, that the frame effectively provides a trailer which can be simply towed behind the tractor on a single point hitch and provides support at one end of the frame for the swather which can then extend out over the ditch.

In accordance with one important feature of the invention, the reel, knife and draper are all driven separately by individual hydraulic motors and there is provided an hydraulic pump on the frame including drive connection means for attaching the pump to the PTO shaft of the towing vehicle or tractor. In this case, the reservoir for the hydraulic pump can provide a counterbalance weight on the end of the frame remote from the swather device.

In accordance with a further feature of the invention, the ground wheel supporting the frame at the end adjacent the swather device is one of a pair of such wheels in an arrangement known as a walking beam in which the wheels are mounted with their axes spaced and parallel along the beam with the beam in turn mounted pivotally relative to the frame about an axis intermediate the two wheels. The walking beam arrangement enables the end of the frame adjacent the swather to run along the top of the ditch which in many cases can be very uneven. In this circumstance the walking beam tends to reduce the effect of the unevenness in the ground and can prevent damage caused by vigorous movement to the swather and in some cases, bursting of the tires by engagement with the uneven ground.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 2 is a rear elevational view of the ditch swather of FIG. 1.

FIG. 3 is a side elevational view from the left hand end of FIG. 2.

FIG. 4 is a cross sectional view along the line 4—4 of FIG. 2.

FIG. 5 is a rear elevational view showing the swather device in the vertically raised position for transport.

In the drawings like characters of reference indicate corresponding parts in the different figures.

DETAILED DESCRIPTION

Figure 1:
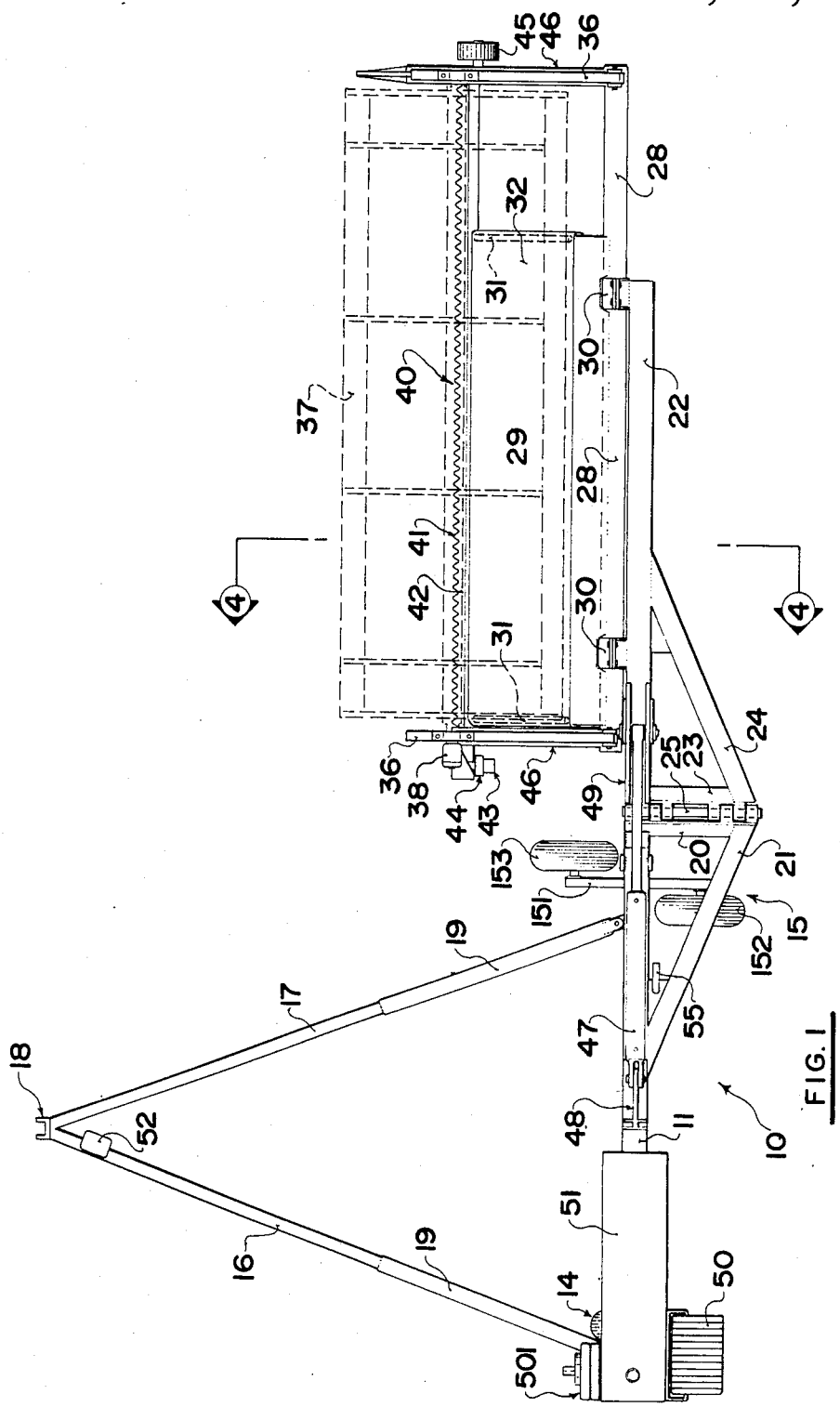
FIG. 1 is a plan view of the ditch swather according to the invention.

The swather comprises a first frame section generally indicated at 10 comprising basically a transverse beam 11 having a pair of depending legs 12 and 13 for receiving ground wheels indicated at 14, 15.

The ground wheels 14 are arranged as a co-axial pair mounted directly on the leg 12, one on either side of the leg. The ground wheels 15 are mounted on a walking beam 151 which is mounted on the bottom of the leg 13 at a mid-point of the beam so as to be pivotable about a horizontal axis parallel to the frame member 11. One wheel 152 is mounted on the beam rearwardly of the pivot point and the other wheel 153 is mounted on the beam forwardly of the pivot pin with an axis parallel to the pivot axis of the beam so that the beam can pivot to take up varying levels of ground which are different between the two wheels 152 and 153.

The leg 13 is supported by a transverse strut 155 to accommodate the offset load applied by the walking beam 151.

The beam 11 includes a pair of forwardly extending hitch arms 16, 17 attached to a single point hitch 18 forwardly of the beam 11. The hitch 18 can therefore be attached to a tractor or the pulling vehicle so that the frame follows directly behind the tractor with the beam 11 transverse to the direction of motion. The arms 16 and 17 are connected to the base of the respective legs 12, 13 for pivotal movement about a vertical axis and are held against movement about a horizontal axis by a support strip 19 connected between the upper end of the leg 13 and a position along the respective hitch bar 16, 17.

At the right hand end of the beam 11, as shown in FIG. 1, a rearwardly extending frame member 20 is attached and is supported at right angles to the beam 11 by a support strut 21. The beam and frame member 20 lie in the same horizontal plane.

A swather section includes a beam 22 parallel to and similar to the beam 11. The beam 22 supports a frame member 23 and support strut 24 symmetrically to the member 20 and strut 21 so that they abut one another to receive a pivotal coupling 25 including a pivot pin lying a horizontal plane transversely to the beams 11 and 22. The beams 11 and 22 can be formed from square section tubing of the order of six inches in diameter to provide sufficient strength for supporting the frame and for supporting the swather section.

The abutting faces of the ends of the beams 11 and 22, as shown in FIG. 2 are mitered so as to provide an angle therebetween of the order of 45° as indicated at 26 so that the beam 22 can pivot downwardly about the pivot pin 25 to an angle of approximately 45° relative to the beam 11.

The beam 22 terminates partly across the swather section and is completed in the full extent of the swather section by a cylindrical member 28. The beam 22 and frame section 28 support a table 29 which is arranged for pivotal movement about support brackets 30 so that it can be raised and lowered relative to the ground. The table extends downwardly and forwardly and then substantially horizontally and supports a pair of draper rollers 31 carrying a draper canvas 32. The table 29 can be raised and lowered by a hydraulic piston/cylinder arrangement 33 coupled between the forward end of the table 29 and the downwardly depending leg 34 attached to the beam 22. In addition, the piston/cylinder 33 carries a spring 35 which allows the table to float so that it can lift from a fixed position should it contact the ground at any uneven point and then can return by its own weight to the proper cutting position controlled by the piston/cylinder 33.

Frame section 28 also supports a pair of arms 36 which carry a reel 37 of conventional form. The reel 37 is mounted for rotation on bearings carried by the arms 36 and is driven by an hydraulic drive motor 38 positioned at one end of the reel on one of the arms 36. The arms 36 can be raised and lowered by an hydraulic piston/cylinder arrangement 39 coupled between the table 29 and the arm 36 so the reel can be lifted away from the table and also rotates with the table about the bracket 30 as previously explained.

At the front end of the table is provided a horizontally reciprocal knife blade 40 of the sickle type which carries a number of teeth 41 which cooperates with guide teeth 42 on the front of the table. The knife is reciprocated back and forth by a hydraulic drive motor 43 and a cooperating pitman drive 44. The knife blade and drive mechanism are of conventional form and therefore do not require further description here.

The end of the swather section remote from the frame 10 is supported by a solid rubber tired wheel 45 mounted on a depending leg 46 coupled to the frame member 28. The wheel 45 therefore acts as a gauge wheel which controls the spacing of the knife blade 40 relative to the ground as adjusted by the position of a piston/cylinder 33. The gauge wheel 45 is of smaller diameter than the ground wheels of the frame 10 and is solid so that it provides an accurate gauge of the position of the ground and more accurately follows the contours of the ground than would a larger diameter wheel.

The wheel 45 is subject to very rough usage in ditches. The solid rubber tire protects against conventional tire failure.

The swather section can be lifted relative to the frame 10 by pivotal movement about the pivot pin 25 actuated by a piston/cylinder 47. A pair of respective support frame portions 48 and 49 are mounted on the beams 11 and 22 respectively to space the cylinder 47 from the plane of the pivot 25 to obtain the necessary mechanical advantage to lift the swather section.

The amount of movement allowed enables the swather section to rise to a vertical position as shown in FIG. 5 which can be used for transport or for lifting the swather section away from the ground, for example, at intersecting roadways and sign posts.

The swather can be locked in the raised position by a pin 55 which passes through holes in the portion 49 and a cooperating lug 56 on the beam 21.

The counterbalance the weight of the swather section, a plurality of weights indicated at 50, 501 is mounted on the beam 11 immediately above the leg 12. These weights are of conventional form and can be mounted on the bracket in such a manner that their number can be increased and decreased according to requirements.

In addition, a reservoir 51 for a hydraulic pump 52 is mounted above the leg 12. The pump 52 is mounted adjacent the hitch 18 for direct drive from the PTO shaft of the tractor attached to the hitch 18. For convenience of illustration, the hydraulic connections between the reservoir 51, the pump 52, the drive motor for the reel 38, the drive motor for the knife 43 and a drive motor for the draper roller schematically indicated at 53. Thus, the rotating for the swather are all hydraulically controlled which provides a convenient, efficient and reliable drive system which can be coupled directly to the PTO shaft of the tractor.

The cylinders 39, 33 and 47 can be directly connected to the hydraulic system of the tractor but again the connecting lines are omitted for clarity from the drawings.

During normal operation of the device, the frame 10 is drawn by the tractor with the swather section extending out to the one side. When the frame and swather reach the position of the ditch which is to be cut, the swather section is lowered into the ditch with the wheels 15 running along the upper edge of the ditch so the tractor and frame remain on level or horizontal ground. The swather section thus extends downwardly into the ditch at an angle of up to 45° depending upon the inclination of the ground and as controlled by the wheel 45.

During this movement the reel, knife and drapers are driven to cut the crop and to transport the crop towards the outer end of the swather to form a swath which is deposited between the wheel and the outer end of the draper canvas 32. The swather thus forms a proper swath of the cut crop which can later be collected. The swath is formed at the outer end as this will, in practice, be at the bottom of the ditch so that a second path along the other side of the ditch will, in practice, form a second swath close to or on top of the first swath.

The walking beam 151 is particularly effective in accommodating the uneven ground which can often be found at the top of the ditch due to erosion and improper road maintenance.

When the ditch has been completed or on reaching a cross road or other obstacle, the swather section can be lifted by operating the cylinder 47 to the vertical position illustrated in FIG. 5.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A ditch swather comprising a frame having spaced parallel ground wheels for supporting the frame and hitch means by which the frame can be pulled in a direction transverse to its length to follow behind the hitch means, a swather device including a reciprocating toothed drive blade for cutting a crop, a reel and a draper for guiding the cut crop into a swath for deposit behind the swather device, means mounting the swather device on one end of the frame such that the swather device extends outwardly from said one end for forward motion with said frame, said mounting means allowing pivotal movement of the swather device relative to the end of the frame about a horizonal axis transverse to the frame whereby the swather device can incline downwardly for operating upon a ground surface inclined to the ground surface on which the frame is supported and including means for lifting said swather device from said downwardly inclined position and a gauge wheel on the end of the swather device remote from the frame for controlling the height from the inclined ground surface of the blade, wherein the ground wheel at said one end of the frame is mounted as one of a pair on a beam, which beam is mounted for pivotal movement relative to the frame about a horizontal pivot axis parallel to the axes of the wheels, the wheels being spaced in a direction transverse to the frame either side of the pivot axis.

2. The invention according to claim 1 wherein the draper is arranged to form a swath adjacent the end of the swather device remote from the frame.

3. The invention according to claim 1 wherein the gauge wheel includes a solid rubber tire and is of smaller dimension than the ground wheels.

4. The invention according to claim 1 wherein the reel, knife blade and draper are driven by separate hydraulic motors and wherein there is provided a hydraulic pump including drive connection means for attachment to the PTO shaft of a towing vehicle.

5. The invention according to claim 1 wherein the hitch means comprises a simple single point hitch.

6. The invention according to claim 1 wherein the lifting means is arranged to lift the swather device up to a vertically upwardly extending position relative to the frame.

7. The invention according to claim 1 wherein the mounting means is arranged to allow a downward incline of the swather device relaive to the frame of the order of 45°.

8. The invention according to claim 1 including counterbalance weight means on the end of the frame remote from the swather device.

9. The invention according to claim 8 wherein the weight means includes a reservoir for an hydraulic pump.

10. A ditch swather comprising a frame in the form of an elongate beam, ground wheels at respective ends of the beam for supporting the beam for movement in a direction transverse to its length, hitch means extending forwardly from the beam and connected to the beam adjacent respective ends whereby the hitch means can be coupled to a single-point hitch for pulling the beam in said direction, a swather device including reciprocating tooth drive blades for cutting a crop, a reel and a draper for guiding the cut crop into a swath for deposit behind the swather device, hinge means on one end of said beam having a first hinge portion directly on said beam and second hinge portion directly on said swather device and defining therebetween a single horizontal pivot axis for mounting the swather device on said end such that the swather device extends outwardly from said end for forward motion with said beam, said hinge means allowing pivotal movement of the swather device relative to said end about a said single pivot axis transverse to the beam whereby the swather device can incline downwardly for operating upon a ground surface inclined to the ground surface on which the frame is supported, hydraulic lift means having one end thereof mounted on said beam and an opposed end thereof attached to said swather device for lifting said swather device from said downwardly inclined position to a raised position abobe a horizontal line extending from said hinge means, a gauge wheel on the end of the swather device remote from the frame for controlling the height of the swather device from the inclined ground surface and counterweight means on the other end of said beam to resist tipping of said frame when lifting said swather device, said frame being free from blade means for cutting the crop on the underside thereof and on a side thereof remote from the swather device.

11. The invention according to claim 10 wherein the ground wheel at said one end of the frame is mounted as one of a pair on a beam, which beam is mounted for pivotal movement relative to the frame about a horizontal pivot axis parallel to the axes of the wheels, the wheels being spaced in a direction transverse to the frame either side of the pivot axis, 12. The invention according to claim 10 wherein the draper is arranged to form a swath adjacent the end of the swather device remote from the frame.

13. The invention according to claim 10 wherein the gauge wheel includes a solid rubber tire and is of smaller dimension than the ground wheels.

14. The invention according to claim 10 wherein the reel, knife blade and draper are driven by separate hydraulic motors and wherein there is provided a hydraulic pump including drive connection means for attachment to the PTO shaft of a towing vehicle.

15. The invention according to claim 10 wherein the mounting means is arranged to allow a downward incline of the swather device relative to the frame of the order of 45°.

16. The invention according to claim 10 wherein the weight means includes a reservoir for an hydraulic pump.

* * * * *